United States Patent Office 3,655,890
Patented Apr. 11, 1972

3,655,890
COMPOSITIONS CONTAINING 3,6-DISUBSTITUTED SYMMETRICAL TETRAZINES, SALTS THEREOF AND METHOD OF USE THEREOF
Gordon Arthur Kemp, Princeton, Howard John Bachmann, Spring Lake, Gerald Berkelhammer, Princeton, and Goro Asato, Titusville, N.J., assignors to American Cyanamid Company, Stamford, Conn.
No Drawing. Continuation-in-part of application Ser. No. 684,619, Nov. 21, 1967. This application Aug. 17, 1970, Ser. No. 64,597
Int. Cl. A61k 27/00
U.S. Cl. 424—244          10 Claims

ABSTRACT OF THE DISCLOSURE

This invention relates to compounds, compositions and a method for controlling the growth of pathogenic microorganisms in warm-blooded animals by administering to said hosts an effective amount of a substituted symmetrical tetrazine compound.

This application is a continuation-in-part of our application Ser. No. 684,619, filed Nov. 21, 1967, now abandoned.

BACKGROUND OF THE INVENTION

Although preparations for several of the compounds of the invention have been described in the literature, there is no disclosure or suggestion that any of the compounds of the invention can be used for controlling the growth of pathogenic bacterial microorganisms in warm-blooded animals, Lutz et al., U.S. Pat. 3,166,399 issued Jan. 19, 1965, disclose and claim the use of various unsymmetrically substituted-s-tetrazines, including 3-(p-chlorophenyl)-6-dimethylamino-s-tetrazine for controlling undesirable plant species.

In U.S. Pat. 2,369,371, issued Feb. 13, 1945, J. K. H. Seiberlich describes a method for preparing resinous condensation products by reacting diamino tetrazine with various aldehydes and the Kodak Company, in French Pat. 866,741, issued Aug. 30, 1941, states that 3,6-diamino tetrazine may be used as a sensitizer or in the preparation of sensitizers for photographic emulsions. These teachings, while important in other fields, are clearly distinguishable from the surprising discovery of the present invention which provides an effective means of controlling bacterial infections, for example, Staphylococcus and Salmonella infections in warm-blodded animals. Particularly important is the discovery of activity of the compounds of the invention against Salmonella. Since such infections have become quite prevalent in recent years in poultry and young mammals, and outbreaks of mixed infections are being reported in increasing numbers, the problem of control of these infections is a major concern not only to commercial breeders but also to those responsible for maintaining wild life preserves, zoological parks and the like. As the disease has become more widespread, a substantial effort has been made by public and private organizations alike to (1) provide means, mainly in the form of drugs, for combatting immediate outbreaks of disease in flocks or herds and (2) determine the vectors of Salmonella. While investigations directed to the latter approach have been quite successful and have established that flies, vermin, reptiles and even man are vectors for this disease, to date no entirely satisfactory method of and composition for controlling the disease in an infected host has been available. Sulfa drugs, mixtures of sulfa drugs and nitrofurans have been used with some beneficial results; however, still more effective drugs are required if the disease is to be controlled.

SUMMARY OF THE INVENTION

The present invention relates to a method of controlling the growth of gram positive coccal infections and gram negative Enterobacteriaceae infections in warm-blooded animals by administering thereto an effective amount of a compound having the formula:

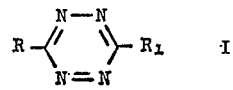

wherein R and $R_1$ represent members selected from the group consisting of amino, lower alkylamino, dilower alkylamino, lower alkanoylamino, dilower alkanoylamino, benzoylamino, chloro lower alkanoylamino, chloropheny, and (lower alkyl)$_2$N—CH=N—, with the proviso that not more than one of the R and $R_1$ groups are chlorophenyl, and non-toxic therapeutically useful salts thereof.

The invention also relates to novel compounds of the formula:

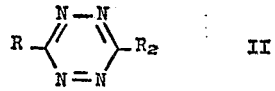

wherein R is as described hereinabove and $R_2$ represents a member selected from the group consisting of lower alkanoylamino, dilower alkanoylamino, benzoylamino, chloro lower alkanoylamino, dichloro lower alkanoylamino and (lower alkyl)$_2$N—CH=N— and salts thereof.

In the present compounds lower alkyl is intended to include those having 1 to 6 carbon atoms and lower alkanoyl 1 to 6 carbon atoms. Among the therapeutically useful salts are hydrochloride, hydrobromide, sulfate, and the like.

In accordance with the present invention, bacterial infections as described hereinafter are controlled in poultry or birds such as chickens, turkeys, ducks, pigeons and geese and in warm-blooded animals such as swine, sheep, goats, cattle and monkeys by administering to said hosts, generally in their feed or drinking water, an effective amount of a compound of the Formula I described above.

Although administration of the compounds will generally be most practical in or with the feed, or in the drinking water, the compounds may also be administered to individual hosts in the form of tablets, drenches, capsules, or the like. These latter methods of administration are of course, less practical for treatment of large flocks and herds than they are for treating limited members of animals or birds, but they are quite practical for use in pet shops, zoos and similar establishments where attention is given on an individual basis.

With the compounds of the instant invention, medicated feeds are usually prepared by thoroughly admixing about 0.001% to 0.25% by weight and preferably about 0.006% to 0.1% by weight of active compound with a nutritionally balanced animal or poultry feed, as for example, the chick feed described in the examples hereinafter.

Where it is desirable to prepare a concentrate or premix for ultimate dilution in feed to the above levels, generally about 10% to 95% and preferably about 20% to 50% by weight of medicament is blended with an edible carrier, e.g., corn meal or corn and soybean meal, containing a small amount of an edible dusting oil such as corn oil, or soybean oil. The thus prepared premix may then be added to the animal or poultry feed just prior to administration.

To prepared a top dressing for feeds for animals, such as swine, cattle, sheep and the like, generally from about 0.25% to 5.00% by weight of the active tetrazine is admixed with a feed stuff such as alfalfa meal and the mixture granulated or pelleted. The resulting composition is then administered as a dressing over the feed.

In accordance with the invention, 3,6-diamino-s-tetrazine is prepared by the reaction of s-methylisothiosemicarbazide with an alkali metal hydroxide in aqueous solution. The reaction is generally carried out at room temperature but may be carried out at an elevated temperature preferably between about 50° C. and 70° C., and after cooling the thus formed product is separated from the reaction mixture.

Compounds of the formula:

wherein R is chlorophenyl and $R_1$ represents a member selected from the group consisting of amino, lower alkylamino and dilower alkylamino are readily prepared by treating 3-bromo-6-(p-chlorophenyl)-s-tetrazine with ammonia or the appropriate amine. The reaction is generally carried out in a non-reactive solvent such as benzene, xylene, methylisobutylketone, chlorinated hydrocarbons or the like, preferably at a temperature between about 10° C. and 30° C.

As previously indicated, certain of the substituted symmetrical tetrazines which we have found to be effective for the control of both gram positive and gram negative bacterial infections, particularly Salmonella and Staphylococcus infections, in poultry and other warm-blooded animals are new and unobvious. These new compounds are depicted by the formula:

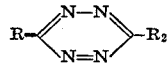

wherein R is as described above and $R_2$ represents a member selected from the group consisting of lower alkanoylamino, dilower alkanoylamino, benzoylamino, chloro lower alkanoylamino, dichloro lower alkanoylamino and (lower alkyl)$_2$N—CH=N—. These novel compounds are readily prepared by the reaction of 3,6-diamino-s-tetrazine or 3-amino-6-(p-chlorophenyl)-s-tetrazine with a compound of the formula:

$$R_3-CO-X$$

wherein X is halogen, such as chlorine, bromine or iodine, but preferably chlorine, and $R_3$ represents a member selected from the group consisting of lower alkyl, halosubstituted lower alkyl and phenyl or with the acid anhydride of the formula:

Usually, the reaction is conducted in the presence of a dispersant, solvent or diluent such as dimethylformamide, alkylamides, pyridine, benzene or the like, or an organic acid of the formula:

$$R_3COOH$$

where $R_3$ is as described above. In the case of the use of acid anhydride as reactant, excess anhydride may be employed as solvent whenever it is practical. Where the organic acid is employed in said reaction, it is most advantageous to use the acid which corresponds to the alkanoyl halide reactant. The reaction may be carried out over a wide temperature range, for example, between about 10° C. and 200° C. and preferably between about 40° C. and 170° C. The thus formed product is readily recovered from the reaction mixture using conventional techniques.

Preparations of the above-identified compounds wherein at least one of said R and $R_2$ is (lower alkyl)$_2$N—CH=N— are readily carried out by the following process which involves treating an N,N-dilower alkyl formamide with phosgene gas and admixing therewith 3,6-diamino-s-tetrazine. The reaction is advantageously conducted at ambient temperature employing approximately equimolar amounts of phosgene and tetrazine. Treatment of the thus formed product with an alkali metal bicarbonate in aqueous solution yields the monoamidine and extraction of the filtrate from the reaction mixture with a polar solvent such as ethyl ether yields the bis-amidine. Said amidines may then be converted to their acid salts by treatment thereof with an alcoholic solution of hydrogen halide.

DETAILED DESCRIPTION

The following examples illustrate the preparation of specific substituted symmetrical tetrazines and their use in combating the growth of pathogenic microorganisms.

EXAMPLE 1

Preparation of 3-(p-chlorophenyl)-6-dimethylamino-s-tetrazine

Liquid dimethylamine (30 g.) is weighed in a 250 ml. pressure bottle in a —70° C. and 7.65 g. of 3-bromo-6-(p-chlorophenyl)-s-tetrazine is carefully added. The bottle is capped and allowed to rise to room temperature. After 72 hours, the bottle is cooled again, opened, and the amine allowed to evaporate. The solid which remains is triturated with water, filtered, washed with water and dried.

EXAMPLE 2

Preparation of 3,6-diamino-s-tetrazine

In 20 ml. of water 8 g. of S-methylisothiosemicarbazide hydroiodide is dissolved, stirred and the pH is adjusted to 7.12 to 7.4 with 10% sodium hydroxide for 24 hours at 60±3° C. The mixture is cooled and the red product is collected.

EXAMPLE 3

Preparation of 3,6-bis(2,2-dichloroacetamido)-s-tetrazine

A suspension of 6.73 g. (0.06 mole) of 3,6-diamino-s-tetrazine in 90 ml. of 2,2-dichloroacetic acid is treated with 17.7 g. (0.12 mole) of 2,2-dichloroacetyl chloride. The orange mixture is warmed until the solid dissolves and then heated at 135° C. for 30 minutes. The reaction mixture is cooled, 500 ml. of ether added, and the solid collected and washed with 95% ethanol and ether. The product is recrystallized from a mixture of ethyl acetate, N,N-dimethylformamide and ethanol to afford 9.0 g. (45%) of the title compound, melting point 282–283° C. with decomposition.

EXAMPLE 4

Preparation of 3,6-bis-N,N'-benzamido-s-tetrazine

To a suspension of 5.6 g. (0.05 mole) of 3,6-diamino-s-tetrazine in 100 g. of molten benzoic acid at 150° C. is added 14 g. (0.1 mole) of benzoyl chloride. The solid dissolves to give a red solution which is heated at 150–160° C. for one hour. The mixture is cooled by the slow addition of 300 ml. of benzene to prevent the solidification of benzoic acid, and when sufficiently cooled, 400 ml. of ether is added. The product is collected, washed with ether, and recrystallized from a mixture of 250 ml. of 95% ethanol and 100 ml. of N,N-dimethylformamide to give 4.9 g. (30%) of the title compound as pink crystals, melting at 280–282° C.

EXAMPLE 5

Preparation of 3-amino-6-(2,2-dichloroacetamido)-s-tetrazine

The procedure of Example 3 is followed except that only 8.8 g. (0.06 mole) of 2,2-dichloroacetyl chloride is used. By adding 1000 ml. of ether to the reaction mixture and then slowly evaporating the resulting solution one obtains 4.4 g. (30%) of the title compound, melting at 208–210° C.

EXAMPLE 6

Preparation of 3-amino-6-(n-hexanamido)-s-tetrazine

A suspension of 1.1 g. (0.01 mole) of 3,6-diamino-s-tetrazine in 20 g. of n-hexanoic acid is heated to 140° C. and 1.34 g. (0.01 mole) of n-hexanoyl chloride is added over 40 minutes. The resulting mixture is heated at 140° C. for an additional 20 minutes, cooled, and 200 ml. of ether is added. The solution is filtered and the filtrate deposits 500 mg. (24%) of organge title compound, melting at 205° C.

EXAMPLE 7

Preparation of 3-amino-6-(n-hexanamido)-s-tetrazine

The procedure of Example 6 is followed except that N,N-dimethylformamide is used instead of n-hexanoic acid. It is only necessary to heat the reaction at 40–60° C., and the product is obtained by diluting the reaction mixture with water. Recrystallization from a mixture of ethyl acetate and N,N-dimethylformamide affords 6.1 g. (48%) of title compound, melting at 204–205° C.

EXAMPLE 8

Preparation of 3-amino-6-(n-dodecanamido)-s-tetrazine

To a suspension of 4.48 g. (0.04 mole) of 3,6-diamino-s-tetrazine in 200 ml. of N,N-dimethylformamide at 80° C. is added 8.75 g. (0.04 mole) of lauroyl chloride. The reaction is heated at 100–110° C. for 15 minutes, cooled, and poured into 1600 ml. of water. The solid is collected, washed with ethanol and ether, and recrystallized from a mixture of ethanol and N,N-dimethylformamide to give 6.6 g. (56%) of orange title compound, melting at 194° C.

EXAMPLE 9

Preparation of 3-acetamido-6-amino-s-tetrazine and 3-amino-6-(N,N-diacetylamino)-s-tetrazine In 30 ml. of acetic anhydride, 1.7 g. of 3,6-diamino-s-tetrazine is refluxed for 45 minutes, cooled, and the solid is collected and washed with acetone. This acetone insoluble solid, melting point 278–280° C. (dec.) is 3-acetamido-6-amino-s-tetrazine; wt. 0.45 g. The filtrate is evaporated to dryness and triturated with acetone to give 0.12 g. of the above compound, melting point 275–280° C. (dec.). The acetone-soluble portion is concentrated and cooled to give a red-orange solid, melting point 155° (dec.), which weighs 0.15 g. after washing with acetone. This solid is 3-amino-6-(N,N-diacetylamino)-s-tetrazine. Evaporation of the filtrate gives 1.91 g. of red-orange residue which is recrystallized from ethanol. This solid is treated with acetone to remove additional monoacetylated product. The acetone is removed from the filtrate and the residue is recrystallized from ethanol to give 1.62 g. of 3-amino-6-(N,N-diacetylamino)-s-tetrazine in two crops, which starts to melt at 154° C. before rearranging to 3,6-diacetamido-s-tetrazine.

EXAMPLE 10

Preparation of 3,6-diacetamido-s-tetrazine

In 50 ml. of acetic anhydride, 1.5 g. of 3,6-diamino-s-tetrazine is refluxed for 4 hours. The mixture is cooled, the solid filtered and washed thoroughly with acetone, melting point >310° C.; the yield is 2.42 g.

EXAMPLE 11

Preparation of 3-methylamino-6-(p-chlorophenyl)-s-tetrazine

In 150 ml. of benzene, 3 g. (0.011 mole) of 3-bromo-6-(p-chlorophenyl)-s-tetrazine is treated with anhydrous methylamine for an hour at 15–25° C. The mixture is cooled, the solid is collected and washed with water; this solid melts at 207–209° C. Evaporation of the benzene from the filtrate gives additional product which melts at 205–207° C. after it is washed with water. The combined yield is 2.46 g.

EXAMPLE 12

Preparation of 3-amino-6-(chlorophenyl)-s-tetrazine

Using the method employed in the preparation of 3-methylamino-6-(p-chlorophenyl)-s-tetrazine (Example 11) and substituting for methylamine ammonia gives 2.05 g. of bright orange solid, melting point 244–247° C.

EXAMPLE 13

Preparation of 3-amino-6-(dimethylaminomethylene)amino-s-tetrazine and 3,6-bis(dimethylaminomethylene)amino-s-tetrazine Phosgene gas is passed into 100 ml. of N,N-dimethylformamide at 5° C. until 4.95 g. (0.05 mole) is absorbed and a crystalline suspension is produced. This is added, over twenty minutes, to a suspension of 5.61 g. (0.05 mole) of 3,6-diamino-s-tetrazine in 100 ml. of dry N,N-dimethylformamide, and the resulting mixture stirred at 25° C. for 20 hours. An orange solid (8.7 g.) is collected, washed with ether and dried under reduced pressure at 25° C. The solid is dissolved in 200 ml. of water and treated with solid sodium bicarbonate until gas evolution ceases. The solution is extracted with three 200 ml. portions of chloroform which are combined, dried over magnesium sulfate, and evaporated to give a red solid which is redissolved in 65 ml. of chloroform. By reducing the volume to 30 ml. and by cooling, 2.9 g. (35%) of title compound, mono-amidine, is collected which melts at 180–182° C. The filtrate is diluted with ether to afford 1.9 g. (17%) of title compound, bis-amidine, melting at 210–212° C.

EXAMPLE 14

Preparation of 3-amino-6-(dimethylaminomethylene)amino-s-tetrazine hydrochloride A solution of 2.9 g. (0.018 mole) of the monoamidine of Example 13 in 6–8 ml. of dry N,N-dimethylformamide is treated with an excess of saturated ethanolic hydrogen chloride. An orange solid forms upon the addition of ether to the reaction mixture. The ether is decanted and fresh ether is added. In this manner, the solid is thoroughly washed until free of N,N-dimethylformamide. The solid is dried to give 3.1 g. (88%) of title compound melting at 203–205° C.

EXAMPLE 15

Preparation of 3,6-bis{(dimethylaminoethylene)amino}-s-tetrazine hydrochloride

The procedure of Example 14 is followed except that 1.9 g. (0.012 mole) of the bis-amidino-s-tetrazine of Example 13 is used instead of the mono-amidino-s-tetrazine. This gives 2.1 g. (61%) of title compound as a pink powder which melts at 210–212° C.

EXAMPLE 16

Preparation of 3-acetamido-6-(p-chlorophenyl)s-tetrazine

A mixture of 2 g. of 3-amino-6-(p-chlorophenyl)-s-tetrazine and 40 ml. of acetic anhydride are heated under reflux for three hours. Cooling and removal of the excess acetic anhydride under vacuum leaves the solid title compound.

Preparation of chick diet

The following feed composition is employed in all the poultry experiments hereinafter set forth:

| | Percent |
|---|---|
| Vitamin pre-mix | 0.5 |
| Trace minerals | 0.1 |
| Sodium chloride | 0.3 |
| Dicalcium phosphate | 1.2 |
| Ground limestone | 0.5 |
| Stabilized fat | 4 |
| Dehydrated alfalfa, 17% | 2 |
| Corn gluten meal, 41% | 5 |

| | Percent |
|---|---|
| Menhaden fish meal, 60% | 5 |
| Soybean oil meal, 44% | 30 |
| Ground yellow corn, fine | To 100 |

The vitamin pre-mix in the above feed composition is prepared from the following formulation. The expressions of quantity relate to units per kilogram of the feed composition.

| | | |
|---|---|---|
| Butylated hydroxy toluene | mg | 125 |
| dl-Methione | mg | 500 |
| Vitamin A | I.U. | 3300 |
| Vitamin $D_3$ | I.C.U. | 1100 |
| Riboflavin | mg | 4.4 |
| Vitamin E | I.U. | 2.2 |
| Niacin | mg | 27.5 |
| Pantothenic acid | mg | 8.8 |
| Choline chloride | mg | 500 |
| Folic acid | mg | 1.43 |
| Menadione sodium bisulfate | mg | 1.1 |
| Vitamin $B_{12}$ | mcg | 11 |

Ground yellow corn, fine, to 5 gm.

EXAMPLE 17

Tests against the infection *Salmonella gallinarum*

One-day-old sex-linked pullet chicks are infected orally by gavage with 0.5 ml. of a $10^{-2}$ dilution of a five hour Trypticase Soy Broth culture of *Salmonella gallinarum*, the causative agent of fowl typhoid. Each chick receives approximately $6 \times 10^6$ viable cells. Medication is administered continuously in the feed beginning three hours before infection and continuing for ten days at which time the test is terminated and survivors counted. These results appear in table form below.

Diet—standard chick diet as described above. Preparation of the medicated feed involves the thorough admixing of a sufficient amount of drug with the feed to provide 0.1% of drug and assure essentially uniform distribution thereof in the feed. Tap water for drinking is available to the chicks throughout the experiment.

| | Dose percent in diet | Survivors/total experiment | | | | |
|---|---|---|---|---|---|---|
| | | 1 | 2 | 3 | 4 | S/T |
| 3,6-diamino-s-tetrazine | 0.1 | 5/5 | 5/5 | 5/5 | 5/5 | 20/20 |
| Infected-untreated | | 0/5 | 0/5 | 0/5 | 0/5 | 0/20 |
| Uninfected-untreated | | 5/5 | 5/5 | 5/5 | 5/5 | 20/20 |

| Compound | Dose, percent | Survivors/total |
|---|---|---|
| 3-amino-6-(p-chlorophenyl)-s-tetrazine | 0.1 | 7/10 |
| 3,6-diacetamido-s-tetrazine | 0.1 | 4/10 |
| 3-acetamido-6-amino-s-tetrazine | 0.1 | 4/10 |
| N-(6-amino-s-tetrazin-3-yl)-diacetamide | 0.1 | 7/10 |
| 3-methylamino-3-(p-chlorophenyl)-s-tetrazine | 0.1 | 3/10 |
| 3,6-bis(2,2-dichloroacetamido)-s-tetrazine | 0.1 | 10/10 |
| N-(6-amino-s-tetrazin-3-yl)-2,2-dichloroacetamide | 0.1 | 10/10 |
| N-(6-amino-s-tetrazin-3-yl)-hexanamide | 0.1 | 10/10 |
| N,N'-s-tetrazin-3,6-diylbisbenzamide | 0.1 | 9/10 |
| N-(6-amino-s-tetrazin-3-yl)-dodecanamide | 0.1 | 5/10 |
| 3-(-p-chlorophenyl)-6-dimethylamino-s-tetrazine | 0.1 | 5/10 |
| 3-amino-6-(dimethylaminomethylene) amino-s-tetrazine | 0.1 | 10/10 |
| 3,6-bis[(dimethylaminomethylene)-amino]-s-tetrazine | 0.1 | 7/10 |
| 3,6-bis[(dimethylaminomethylene)-amino]-s-tetrazine hydrochloride | 0.1 | 4/5 |
| 3-amino-6-(dimethylaminomethylene) amino-s-tetrazine hydrochloride | 0.1 | 4/5 |

EXAMPLE 18

Tests against *Salmonella typhimurium*

One-day-old straight run Beltsville white turkey poults are infected orally by gavage with 0.5 ml. of a $10^{-1}$ dilution of a five hour Trypticase Soy Broth culture of *Salmonella typhimurium* which has originally been isolated from a field outbreak of the disease in turkey poults. Each poult receives approximately $10^7$ viable cells. Medication is offered continuously in the feed from three hours before infection until one week after infection. The experiment is continued for two weeks after medication is stopped. On termination of the experiment all poults are examined and the number of survivors counted. The results are provided below.

| | Dose percent in diet | Survivors/total |
|---|---|---|
| 3,6-diamino-s-tetrazine | 0.05 | 16/20 |
| Infected-untreated | | 4/40 |
| Uninfected-untreated | | 19/20 |

Die—standard turkey mash diet. Medicated feed prepared as previously described.

EXAMPLE 19

Tests against *Salmonella choleraesuis*

Female Swiss Webster mice weighing 20 g. are infected intraperitoneally with 0.5 ml. of a $10^{-2}$ dilution of a five hr. Trypticase Soy Broth (TSB) culture of *Salmonella choleraesuis* var. *kunzendorf*, the causative agent of enteritis in pigs, an organism orginally recovered from a field outbreak of *Salmonella choleraesuis* var. *kunz.* in pigs. Each mouse receives approximately $10^7$ cells as the inoculating dose. Feed medication is continuous from three hours before infection until seven days after infection. Mice are held for an additional seven days after medication is stopped. The mice are then examined and the number of survivors counted and recorded. The results appear below.

| | Dose percent in diet | Exp. 1 | Exp. 2 | Exp. 3 | S/T |
|---|---|---|---|---|---|
| 3,6-diamino-s-tetrazine | 0.05 | 6/10 | 5/10 | 7/10 | 18/30 |
| Infected-untreated | | 2/20 | 1/20 | 2/20 | 5/60 |
| Uninfected-untreated | | 10/10 | 10/10 | | 20/20 |

Diet—commercial mouse chow. The medicated feed is prepared by thoroughly admixing determined amounts of drug with the commercial mouse chow to provide essentially uniform distribution of the drug in the feed.

EXAMPLE 20

This example demonstrates the effectiveness of the compounds of the invention in controlling *Staphylococcus aureus* Smith in warm-blooded animals.

Female white mice weighing approximately 20 gm. each are infected intraperitoneally with 0.5 ml. of $10^{-2}$ dilution of a five hour Trypticase Soy Broth culture of *Staphylococcus aureu* Smith. Immediately after infection, the mice are treated with a single dose, orally by gavage or by subcutaneous injection 0.5 cc. of 0.2% aqueous agar containing a sufficient amount of 3,6-diamino-s-tetrazine to provide 128 mg. of drug/kg. of animal body weight. The mice are then caged and permitted to eat and drink ad libitum for six days. A standard commercial mouse chow and tap water are provided. Six days after infection all mice are examined and mortality counts made. Infected animals receiving 16 mg./kg. of tetracycline hydrochloride and non-medicated infected animals are used as controls.

Six days after treatment, infected mice receiving 128 mg./kg. of 3,6-diamino-s-tetrazine by subcutaneous injection show 5/5 survivors; mice treated with the same amount of drug administered orally, show 4/5 survivors. Mice receiving tetracycline hydrochloride 16 mg./kg. of body weight show 8 of 8 survivors and infected untreated controls show 0 of 20 survivors.

Employing the same drug (i.e., 3,6-diamino-s-tetrazine) and the same 0.2% aqueous agar, 1024 mg., 512 mg. and 256 mg. of drug/kg. of animal body weight are administered subcutaneously and orally to groups of female white mice. No acute toxicity at these respective *doses* is observed. Five of 5 mice in each group survived all treatments.

EXAMPLE 21

Test against *E. coli* in chicks

The following test is conducted to show the effect of the present compound against *E. coli* infection in chicks.

Week-old, sex-linked pullets are experimentally infected via the air sac with approximately 1.9×10⁷ viable colony-forming units of *E. coli* 2, an avian pathogen. Birds are immediately treated with single gavage doses of 3,6-diamino-s-tetrazine and placed in cages by treatment group. They receive feed and water ad libitum until they died or the test is terminated (12 days post-infection). The following results are obtained.

Experimental *E. coli* infection in chicks (air sac 3,6-diamino-s-tetrazine)

| Drug | Dose* (mg./bird) | Survivors per total |
|---|---|---|
| 3,6-diamino-s-tetrazine | 50 | 9/20 |
|  | 12.5 | 16/40 |
|  | 3.125 | 5/20 |
|  | 0.39025 | 3/20 |
| Infected controls | | 2/40 |
| Uninfected controls | | 40/40 |

*Administered as single oral dose by gavage.

EXAMPLE 22

Trypticase soy agar plates containing two fold decreasing concentrations (250 mcg./ml. to 0.015 mcg./ml.) of the test compounds are prepared. Each plate is inoculated with all twenty-five test organisms by the use of a 7439–S multiple inoculator (replicator) from A. H. Thomas Co. After overnight incubation no growth indicates sensitivity of the organism to the concentration of test compound used in the plate and the lowest level of test compound to show complete inhibition is noted as the minimum inhibiting concentration (MIC). The following results are obtained.

MINIMUM INHIBITORY CONCENTRATION—MCG./ML.

| Microorganisms | 3,6-diamino s-tetrazine |
|---|---|
| Gram positive: | |
| 1. *Bacillus cereus* ATCC 10702 | 125 |
| 2. *Bacillus subtilis* ATCC 6633 (PCI 219) | 125 |
| 3. *Micrococcus* (Nurse Coffman) | 125 |
| 4. *Streptococcus agalactiae* Slanetz No. 1 | >250 |
| Gram negative: | |
| 5. *Aerobacter aerogenes* | >250 |
| 6. *Bordetella bronchiseptica* 146–3–2 | >250 |
| 7. *Bordetella bronchiseptica* H 23 | >250 |
| 8. *Bordetella bronchiseptica* Rabbit No. 1 | >250 |
| 9. *Escherichia coli* 2 | 250 |
| 10. *Escherichia coli* ATCC 11229 | 250 |
| 11. *Escherichia coli* LFI–1 TC resistant | 260 |
| 12. *Escherichia coli* LFI–2 TC resistant | 250 |
| 13. *Escherichia coli* LFI–9 TC resistant | 250 |
| 14. *Pasteurella multocida* RC 315 | 62.5 |
| 15. *Pasteurella multocida* 656–6 | 125 |
| 16. *Salmonella choleraesius*—var. *kunzendorf* | 250 |
| 17. *Salmonella dublin* | >250 |
| 18. *Salmonella gallinarum* 605 | 250 |
| 19. *Salmonella typhimurium* | 250 |
| 20. *Salmonella typhosa* ATCC 6539 | 125 |
| 21. *Salmonella choleraesius* | 250 |
| 22. *Corynebacterium xerosis* | 125 |

We claim:

1. A composition for the control of Staphylococcus infections, Salmonella infections and Escherichia infections in warm-blooded animals comprising a nutritional edible carrier and about between 0.001% and 0.25% by weight of a compound of the formula:

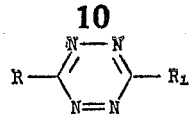

wherein R and R₁ are selected from the group consisting of amino, lower alkylamino, diloweralkylamino, lower alkanoylamino, diloweralkanoylamino, benzoylamino, chloro lower alkanoylamino, dichlorolower alkanoylamino, para-chlorophenyl, and (lower alkyl)₂—N—CH=N— with the proviso that not more than one of the R and R₁ groups is para-chlorophenyl and non-toxic therapeutically useful salts thereof.

2. A composition according to claim 1 wherein said compound is administered in an edible carrier containing about between 0.006% and 0.1% by weight of said compound.

3. A composition according to claim 1 wherein said compound is 3,6-diamino-s-tetrazine.

4. A composition according to claim 1 wherein said compound is 3,6-bis(2,2-dichloroacetamido)-s-tetrazine.

5. A composition according to claim 1 wherein said compound is N-(6-amino-s-tetrazin-3-yl)hexanamide.

6. A composition according to claim 1, wherein said compound is 3 - amino - 6 - (dimethylaminomethylene) amino-s-tetrazine.

7. A method for controlling Staphylococcus infections, Salmonella infections and Escherichia infections in warm-blooded animals comprising administering orally or parenterally to said hosts a prophylactically or therapeutically effective amount of a compound of the formula:

wherein R and R₁ are selected from the group consisting of amino, lower alkylamino, diloweralkylamino, lower alkanoylamino, diloweralkanoylamino, benzoylamino, chloro lower alkanoylamino, dichloro lower alkanoylamino, para-chlorophenyl, and (lower alkyl)₂—N—CH=N— with the proviso that not more than one of the R and R₁ groups is para-chlorophenyl and non-toxic therapeutically useful salts thereof.

8. A method according to claim 7 wherein said compound is 3,6-diamino-s-tetrazine.

9. A method according to claim 7 wherein said compounds is 3,6-dis(2,2-dichloroacetamido)-s-tetrazine.

10. A method according to claim 7 wherein said compound is N-(6-amino-s-tetrazin-3-yl)-hexamide.

References Cited

UNITED STATES PATENTS 3,155,488  11/1964  Lutz et al.

SAM ROSEN, Primary Examiner